3,819,826
COMPOSITION AND MEANS FOR ORAL HYGIENE
Gaetano F. D'Alelio, South Bend, Ind., assignor to
Doan Associates, Midland, Mich.
No Drawing. Filed Aug. 9, 1972, Ser. No. 279,057
Int. Cl. A61k 7/16
U.S. Cl. 424—49          14 Claims

ABSTRACT OF THE DISCLOSURE

Dental *calculus* and tartar, as well as the plaque which leads to the formation of same, are removed from teeth and other portions in the oral cavity by use of compositions constituting or comprised of certain organic carbonates, such as ethylene and propylene carbonate and the like, and/or dimethylsulfoxide.

BACKGROUND OF THE INVENTION

The present invention resides generally in the field of/ and is concerned with oral hygiene. More particularly it relates to the control and/or removal, by essentially non-mechanical means, of so-called dental *calculus* or tartar which is comprised of and results from plaque. Still more particularly, the present invention concerns certain dentifrice compositions of the type not intended to be intentionally ingested which are most efficiently and effectively capable of the control and/or removal of dental *calculus*, and the like.

Dental *calculus*, or tartar, which forms on the surface of the teeth (especially in mammals) at the gingeval margin, is a complex mixture of organic and inorganic substances. As is well known, and generally recognized and appreciated, it is quite detrimental to and highly undesirable for good and acceptable conditions of oral hygiene.

Dental *calculus* is formed on the teeth by the hardening and solidification in the mouth of the material or substance known as plaque which occurs and is present as a result of natural processes. Plaque is comprised of a relatively soft primary organic deposit or portion which, in essence, contains desquamated epithelial cells, leukocytes, salivary sediment, various types of bacterial microorganism, etc.; and an inorganic portion consisting primarily of a calcium phosphate material, the crystal lattice of which is equivalent to that in the hydroxy apatite structure of bone, enamel and dentine.

The mechanism by which the plaque hardens appears to proceed through a calcification involving the seeding of calcium phosphate crystals. As the mature, hardened *calculus* forms, it appears as a visible yellow stain on the teeth. This, unless it is removed, tends to darken noticeably (to a greater or lesser extent depending on particular situations encountered) by absorption of coloring matter in food and by the retention of fine food particles which serve to stimulate further bacterial growth.

In addition to the unsightly, unaesthetic appearance caused thereby, the *calculus* deposits irritate the gingiva. They are thus the contributing source of gingivitis and similar diseases which destroy the supporting structures of the teeth, and coincident and in correspondence therewith, decrease the natural resistance of the tissue to endogeneous and exogeneous organisms.

Supragingival *calculus* forms principally in the areas near the orifices of the salivary ducts. These for example, are on the lingual surfaces of the lower anterior teeth and on the buccal surfaces of the upper first and second molars, as well as on the distal surfaces of the posterior molars. Saliva has adhesive and film forming properties. Since the concentration of saliva is highest in these above-mentioned areas in the buccal cavity, there appears to be a direct relationship between the amount of plaque encountered and the adhesive properties of some of the components of the saliva. Apparently, the saliva components absorbed on the teeth act as the binder for desquamated epithelial cells, leukocytes, organisms, etc., and as the medium for calcification of calcium phosphates.

There have heretofore been proposed and suggested numerous means and agents intended and designed to at least retard, if not eliminate, *calculus* formation or to remove it after it has formed.

One method very well known and widely used involves the mechanical removal of the *calculus*. This is a procedure which is usually done routinely by the dental profession.

A chemical approach to *calculus* inhibition involves the removal of calcium ions by chelation. The removal of calcium ions tends to prevent the formation of new *calculus* or breaks down the integrity of that already-formed. The general class of iminoacetic acid chelating agents, such as ethylenediaminotetraacetic acid, nitrilo-acetic acid and related compounds, have been proposed as anticalculus agents in British Pat. No. 490,384. Sugar lactones have been disclosed in U.S. Pat. No. 1,516,206; while water-soluble diglycolates have been taught in German Pat. No. 1,149,138 as calcium chelating anticalculus substances.

However, the chemical similarity of the composition of a tooth to the hydroxy apatite in the *calculus* limits the usefulness of the chelation technique. This is due to the fact that the effective calcium chelation can decalcify the tooth, causing serious damage to tooth structures. In addition, certain chelators, such as nitrilotriacetic acid, are known to produce undesirable physiological change in living tissue.

More recently, certain compositions containing tris-(phosphonalkyl) amines and their salts have been disclosed in U.S. Pat. No. 3,639,569 as retarding the development of *calculus* without removing calcium from dental enamel by a process believed to involve the inhibition of hydroxy apatite crystal growth.

Other references of interest in the field of the present invention, although specifically relating to and dealing with things and concepts substantiately different from and essentially differentiated by those involved in practice of the present invention, include U.S. Pat. Nos. 2,406,-423; 2,689,170; 2,955,984; 3,324,140; 3,288,846; 3,429,-914; 3,442,604; and 3,639,571; Canadian Pat. No. 603,-921; German Pat. No. 1,255,818; "Dental Abstracts," Vol. 12, No. 9, pp. 539–544, September 1967; Draus *et al.*, "Dental Progress," Vol. 3, No. 2, pp. 79–81, January 1963; and Grossman, "Journal of Oral Surgery, Oral Medicine and Oral Pathology," Vol. 7, pp. 484–487, May 1954.

DESCRIPTION AND CHARACTERIZATION OF THE INVENTION

Fundamental and primary amongst the objectives of the present invention, the following and practice of which possibilitates and allows realization of its many benefits and advantages, is the provision of a highly efficacious, yet non-toxic (even though not proposed or intended for internal ingestion) and relatively inexpensive dentifrice composition(s) for oral hygene, adapted to be retained and/or applied in one way or another, in the oral cavity for a period of time, generally relatively and quite short, sufficient to allow the very effective control and/or removal thereby of dental *calculus* or tartar resulting from plaque—which, in fact, is sometimes identified and called by the same name—which composition(s) may be prepared and employed in such diverse physical forms as dentifrices, mouth washes, prophylactic pastes, topical solutions and so forth and which compositions are comprised, as an essential ingredient therein and thereof in addition, if desired, to other conventional components utilized for equivalent-type insofar as preparation is concerned of particular compositions and preparations of the conventional sort, of certain chemical agents that are capable of dissolving or swelling the organic binder phase of dental *calculus* so as to permit release of same by simple rinsing procedure (with water or other suitable liquid rinse) or by straight forward physical dislodgement (with subsequent physical discharge thereof from the mouth); which chemical agents as hereinafter more fully described and defined are certain selected non-toxic organic solvents of the variety normally used for the purpose of dissolving, or at least swelling, various polymeric materials including dimethyl sulfoxide and, more importantly, various organic carbonate materials as more particularly set forth in the following.

Other objectives and purposes of the invention will also become easily evident and even more readily apparent in the ensuing description and Specification.

As mentioned the chemical agents besides dimethyl sulfoxide that are used with particular advantage in practice of the present invention for preparation of various dental compositions useful in control or elimination of dental calculus or tartar and plaque, which leads to and results in the former, are various and several of the available organic carbonates, which are more specifically represented in the following, and selected from one or more of the class of same, as follows, viz.:

In general, organic carbonates characterized by the structure $$\begin{array}{c} H \\ R-C-O \\ | \quad\quad \diagdown \\ \quad\quad\quad C=O \\ | \quad\quad \diagup \\ R'-C-O \\ H \end{array} \quad (A),$$

wherein

R represents H and aliphatic hydrocarbon groups from 1 to about 18 carbon atoms; and R' represents R, HOR—, RCOOR—, —ROR—, ROR—, —ROCOOR—, —ROCOOR, and

—ROOC—R—COOR—.

Typical examples of compounds according to Formula (A) are ethylene glycol carbonate in which (R=H), as in:

$$\begin{array}{c} CH_2O \\ | \quad \diagdown \\ \quad\quad C=O \\ | \quad \diagup \\ CH_2O \end{array} \quad (I);$$

propylene glycol carbonate, in which (R=CH$_3$), as in:

$$\begin{array}{c} CH_3-CHO \\ | \quad\quad\quad \diagdown \\ \quad\quad\quad\quad CO \\ | \quad\quad\quad \diagup \\ CH_2O \end{array} \quad (II);$$

glyceryl carbonate, in which (R'=HOR), as in:

$$\begin{array}{c} HOCH_2CHO \\ | \quad\quad\quad\quad \diagdown \\ \quad\quad\quad\quad\quad CO \\ | \quad\quad\quad\quad \diagup \\ CH_2O \end{array} \quad (III);$$

acetyl glyceryl carbonate, in which, R'=(RCOOR—), as in:

$$\begin{array}{c} CH_3COOCH_2 \\ | \\ CHO \\ | \quad \diagdown \\ \quad\quad C=O \\ | \quad \diagup \\ CH_2O \end{array} \quad (IV);$$

diglyceryl ether dicarbonate, in which R'=(—R—OR—), as in:

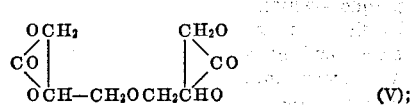

(V);

diglyceryl tricarbonate, in which $$R'=(-RO-CO-OR-)$$

as in:

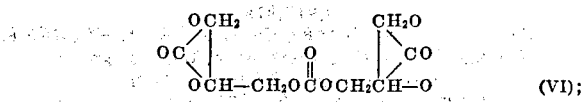

(VI);

ethyl glycidyl ether carbonate, in which R'=(ROR—), as in:

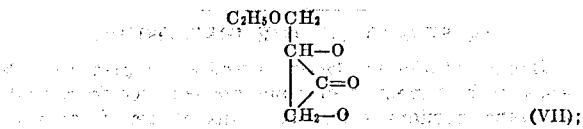

(VII);

di(glycidyl carbonate) fumarate, in which $$R'=(-ROOC-R-COOR-)$$

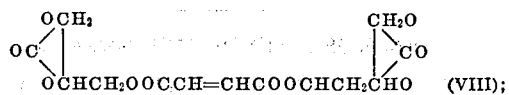

(VIII);

and ethyl(glycidyl carbonate) carbonic esters, in which R'=(—R—OCOOR), as in:

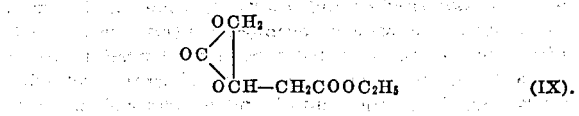

(IX).

As a group, the preferred compounds for utilization in practice of the present invention are those in which R and R' are either hydrogen or hydrocarbons containing from one to about four carbon atoms, as is particularly illustrated in the structures of the above Formulae (I) to (IX). In general, these, conveniently are either liquids at normal room temperature (i.e., at about 27° C.) or, as is the case with compounds having the above-given Formula (I) have a melting point on the order of about 40° C. so as to be readily liquifiable, especially by and when added relatively small amounts of effective and appropriate diluents (as will be readily apparent to those skilled in the art) or other normally liquid carbonate materials.

For discernible reasons of economy and, of at least equal importance, commercial availability, compounds having structures according to the above-given Formulae (I), (II) and (III) are quite often highly advantageous and sometimes, perforce, specifically preferred.

The organic carbonate compounds which can be utilized with such particular and significant advantage in the practice of the present invention are quite readily and economically prepared by the reaction of appropriate precursor alkanols and phosphene, in the presence of a suitable hydrohalide acceptor; or by ester exchange with a lower alkyl carbonic ester, as is illustrated in the following demonstrative equations:

(a)
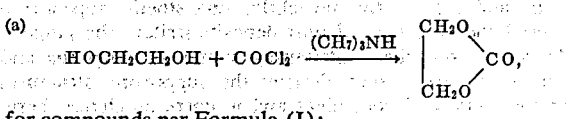

for compounds per Formula (I);

(b)
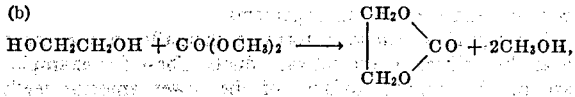

also for compounds per Formula (I);

(c)
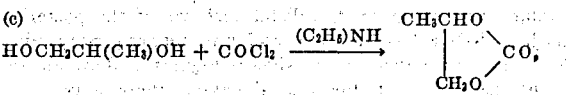

for compounds per Formula (II);

(d) 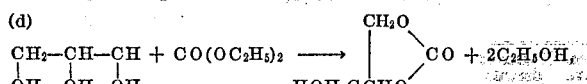

for compounds per Formula (III);

(e) 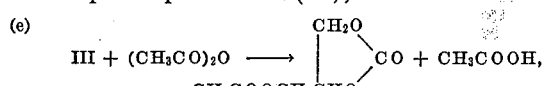

for compounds per Formula (IV);

(f) 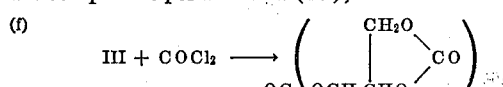

for compounds per Formula (VI); and (g)
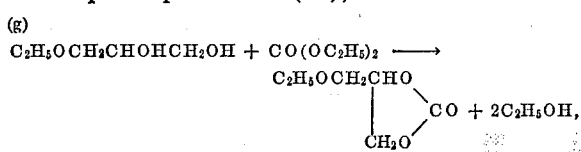

etc.

In similar and analogous fashion, the intermediate compounds utilized in and for the synthesizing the non-toxic carbonates applicable to practice of this invention are either commercially-available, easily procurable market products or are and can be readily prepared for the desired purpose by such well-known and relatively simple esterification reactions as (including reactions with related but analogous materials as those specifically illustrated in the immediate following):

(h) 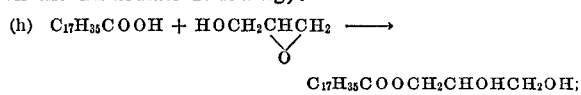

or, in the cases of the intermediate glyceryl ethers, by such etherification reactions as:

(i) 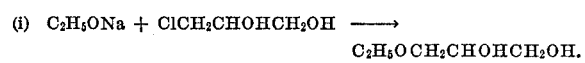

Illustrative examples (but not restricted or limited thereto) of the aliphatic hydrocarbon monovalent R groups that are involved include: $CH_3-$; $C_2H_5-$;

$CH_2=CH-$; $C_4H_9-$; $C_{12}H_{25}-$; $C_{16}H_{33}-$; $C_{18}H_{37}-$;

and, of the aliphatic hydrocarbon groups, including:

$-CH_2-$; $-C_2H_4-$; $-CH=CH-$; $-(CH_2)_{10}-$;

$-CH_2CH=CHCH_2-$; and $-(CH_2)_{18}-$, which as is apparent can be attached to each other or to the monofunctional groups through ether and ester linkages such as are defined according to the above-given definition for R'.

The dimethylsulfoxide (i.e., "DMSO" or, per its chemical formula, $CH_3SOCH_3$) is a well known polymer solvent which, also as has been indicated, is non-toxic and relatively safe material, insofar as reasonable and known and established ingestion limits are concerned, for use in connection with the human and other mammal bodies. However, as a matter which may or may not be of practical or aesthetic significance depending upon the views and sensibilities of the particular individual involved, it is a fact and known that, despite its essentially non-hazardous characteristics insofar as matters of health are concerned, DMSO, when absorbed through the tissues is eliminated via respiratory processes and respiration as and in the form of a mercapto- or sulfide- derivative which has and conveys a relatively mild, albeit definitely noticeable and perceptible, "garlic-like" odor (especially with the breath) which in some instances may be personally offensive to certain individuals. Nonetheless, if the indicated matter is disregarded, DMSO is a very good and desirable material for utilization in practice of the present invention.

The carbonate materials which are advantageous for utilization in the practice of the present invention, especially the lower members of the series involving same, are generally non-toxic substances. This is quite apparent in the following further explanation of the point, in which (per well known and standard utilizations of same) the term "$LD_{50}$" means and represents the dose in milligrams (i.e., "mg.") of any given substance per kilogram (i.e., "kg.") of body weight which causes the death of 50% or more of the test animals under exposure to the substance under evaluation.

Ethylene carbonate is a practically non-toxic material when given or administered in single doses by mouth to male albino mice, the $LD_{50}$ of ethylene carbonate is about 13,300 mg./kg. The mice surviving this dosage recovered completely within 24 hours with no significant gross patheology being noted as an after-effect in survivors sacrificed at the close of a one-week holding time.

In human terms, on the assumption that the toxicities involved are at least relatively close and similar in both species, the $LD_{50}$ would approximately correspond to the massive high-level ingestion in one dose, according to the following schedule of:

0.75 lb./50 lbs. of body weight;
1.5 lb./100 lbs. of body weight;
2.25 lbs./150 lbs. of body weight;
2.625 lbs./175 lbs. of body weight; and
3.00 lbs./200 lbs. of body weight.

For propylene carbonate the $LD_{50}$ is even higher; having an average and general value of about 20,700 mg./kg. This corresponds to approximately 1 lb./50 lbs. of body weight.

Single doses of undiluted ethylene carbonate and undiluted propylene carbonate of about 1 ml. (i.e., approximately 1000 mg.)/kg. were applied to the closely clipped abdominal areas of each of 3 albino rabbits produced no skin irritation nor any other evidence of systemic toxicity. The carbonates were held in contact with the shaven skin of the tested mice under rubber sheeting for approximately one day.

On a second and separate group of six other rabbits, this same dosage was applied for five days per week for a period of two weeks each. No evidence of skin irritation or systemic toxicity attributable the indicated doses was observed over the time period involved in the tests. After a 10-day rest period, a challenge dose applied to these same animals yielded no indication that any sensitivity to the carbonates had been induced in them. Also, there was observed no significant pathological symptoms at autopsy of any of the tested animals.

Comparative tests were made, using therein distilled water for the purpose involved against aqueous solutions of the carbonates utilizable in practice of the invention. Eighteen albino rabbits were divided into three (3) separate and individually isolated groups of six (6) animals each. The first group was used as the control and was treated daily, five (5) days per week, for thirteen (13) weeks with approximately 2-4 ml. (2-4000 mg.)/kg. of distilled water to their closely clipped abdomen under applied rubber sheeting and gauze coverings thereover. The second group was treated in a similar manner excepting that a dosage of about 1 ml./kg. of a 50 weight percent solution of aqueous ethylene carbonate was used. The third group was treated similarly; excepting that a 50% aqueous solution of the carbonate in a dosage of about 4 ml./kg. was applied. After the first week of this treatment with the third group, the carbonate was then used undiluted at a dosage rate of about 2 ml./kg.

Over this extended period of dosing, there occurred (nor was there observed) no significant skin reaction in the rabbits that were involved in the tests, regardless of whether they were receiving either water or the carbonate.

There was, in addition, no evidence of systemic toxicity; and at autopsy, gross and microscopic pathology was discerned and observed to be minimal and no significant or meaningful damage of any other type was found.

The ability of the carbonates adapted for utilization in practice of the invention to produce any sensitization in guinea pigs was also investigated by a modified Landsteiner technique. No sensitivization developed in any of the animals so tested.

Similarly, human patch tests on a series of 200 human beings with and using about 40 weight percent aqueous solutions of ethylene carbonate produced no cases of skin irritation or sensitization.

Analogous and equivalently good and favorable results were obtained upon performance, with the analogous test materials involved, of so-called and repeated "Insult Patch Tests" excepting to use for the purpose in the repetitious respective aqueous solutions of 5 and 10 weight percent of propylene carbonate and, for the purpose of the repeated tests using the procedure of Shelanski and Shelanski, as reproduced in "Proceedings Of The Toilet Goods Association," No. 19 for May 1953.

In this connection, it should be noted at fifty (50) human volunteers were used for the tests. And, quite significantly, no evidence of primary irritation, fatigue reactions or sensitization were evidenced both and either during or after the tests.

In addition to the foregoing and in furtherance of the above explanations, it should be noted and taken into account that the hydrolytic and enzymatic products resulting from application of the organic carbonate materials utilized in practice of the present invention are, in fact, harmless substances which consist essentially of carbon dioxide and a corresponding polyol; which and as examples of same are: ethylene glycol for compounds according to the above Formula (I); propylene glycol for compounds according to the above Formula (II); and glycerine for compounds according to the above Formula (III).

As still further illustration and exemplification of this the following established data should be noted and taken into account. Pursuant to the teachings of J. H. Page, "Journal of Pharmacology" Vol. 30, pg. 313 (1927), ethylene glycol was fed, without any apparent or discernible short- or long-term harm, to dogs at a dosage rate of approximately 9 cc. (i.e., about 10,000 mg.)/kg. of dog weight.

Additional to this, the interperitoneal injection in dogs of about 5 cc. (i.e., approximately 5,500 mg.)/kg. of body weight, as seen in the publication of W. R. Bond and H. B. Haag, "Journal of Laboratory Clinical Medicine," Vol. 12, pg. 882 (1927), produces no toxic effect in the so-tested dogs.

Air saturated with ethylene glycol (at about 0.5 mg./liter) was not found to be lethal to rats subjected to this atmosphere for 28 hours endurance of same during a period of five (5) days. See, in verification of this, the article by F. Flury and W. Wirth, "Arch. Gewerbepath. Gewerbehyg; Vol. 5, pg. 67 (1934).

The effects of propylene glycol and glycerine are very similar to and commensurate with that of ethylene glycol and, in fact, are even more favorably tolerated by rats than ethylene glycol. Note in this connection, P. J. Hanzlek, M. A. Seidenfeld and C. C. Johnson "Journal of Pharmacology," Vol. 41, pg. 387 (1931).

The liquid organic carbonates used in practice of this invention, as is also the case with DMSO, may be employed undiluted and applied directly or alternatively in diluent liquid vehicles in which they are completely soluble, or even only partly soluble or even in those in which they are insoluble but in which they can be dispersed or emulsified or otherwise homogenized.

The subject organic carbonates, as well as DMSO, that are advantageously capable of employment in and for practice of the present invention may be used and incorporated in any of many types of compositions and preparations of various and diverse types for oral hygiene purposes, including any or all of the known varieties of dentifrice and oral hygiene formulations and recipes. Thus, they may readily and conveniently, with great benefit and advantage, be used or employed in and for the preparation of such conventional oral hygiene compositional forms as mouth rinses or washes; or in the form of pastes, liquids or powders; or in and as such variant forms as chewing gums, chewable pills or tablets and so forth. Any or all of these may be fabricated, as may be desired, with or without the addition thereto and therein of such abrasive and/or other substances and additives as: dental grade precipitated calcium carbonate; titanium dioxide; zirconium dioxide; zirconium silicate; submicronic silica; silica gel, etc.; certified food coloring(s) and/or flavoring(s), such as menthol, oil of wintergreen, eucalyptus, clove, cinnamon, methyl salicylate, vannilin, peppermint, spearmint, teaberry, marjoram, anise, fennel, soluble powdered coffee, juniper, etc.; wetting and surface active agents, such as sodium stearate, lithium stearate; as well as those surface active agents which possess antiseptic or bacteriostatic properties, such as dimethylbenzylammonium chloride, -bromide or -iodide, the cetyl pyridinium halides, sodium N-lauroyl sarcoside, and so forth.

The solubility and compatibility of many of these organic carbonates as well as DMSO, with a host of substances allows the preparation of oral compositions to be used by the general public as well as the preparation of specific compositions to be prescribed by licensed physicians, surgeons, dentists and other professionals. Antibiotics, such as penicillin, acromycin and the like; anti-inflammatory agents, such as acetyl salicylic acid, acetyl methyl salicylate, methyl salicylate, oxyphenbutazone (as is described in U.S. Pat. No. 2,745,783) anesthesizing agents, particularly those having topical activity, such as novocaine, procaine, benzocaine and the like (for relief of pain from ill-fitting artificial denture sores, post-dental extractions, gum treatments, etc.); zinc chloride; mercuric chloride; phenylmercuric acetate; mercurichrome; etc., may also and likewise be incorporated into the compositions of the present invention.

As is apparent, use of any one or more of such additaments or additives also serves to preform and carry out valuable additional functions, while at the same time removing or preventing the accumulation of *calculus* and improving oral hygiene.

It should be taken into proper account, as indicated in the foregoing, that the compositions of this invention are also and additionally particularly useful in veterinary medicine, since *calculus* can be removed from teeth of animals other than human without anesthetizing the animal which is the common practice when plaque is removed by mechanical methods causing as a minimum, in many and most cases, at least bleeding of the gums.

While in some instances and under certain conditions, the organic carbonates and/or DMSO utilized in practice of the present invention may be employed in pure or relatively pure form, which is usually advantageous as indicated herein to practice the invention with the carbonate or DMSO effective ingredient in any desirable sort of composition containing therein in a quantity or amount which may be a very minor proportion of the composition, for example on the order of magnitude as low as about 0.1 wt. percent as based on the composition (especially when the interested composition is in the plyable form of a cushion or pad for use under dentures); while, in other cases and for other compositions involved such as various dentifrice preparations, toothpastes, mouth washes, chewing gums and so forth, which is often times desirable to utilize at levels of about 5 wt. percent—and sometimes at least as much as 50 wt. percent—of the carbonate and/or DMSO agent in the composition, based on total weight of composition.

A very practical and significant adjunct and benefit obtainable in and by practice of the present invention, which is of considerable advantage and in frequent cases of great satisfaction, is the fact that most (if not all) of the compositions according to the invention are adapted to and capable of in their usage to remove plaque and the like from the general interior of the oral cavity above and beyond those surfaces therein that occur and are found to be disposed on the teeth (natural or of the artificial dentifrice type); such as and especially the coatings of this plaque orign — which are oftentimes at least annoying if not actually discomforting, painful or harmful—on the lingual surfaces in the mouth, particularly on the upper (and oftentimes rearward thereof) surface of the tongue. In other words, besides the obvious *desiderata* of the present inventin as regards control and/or removal of dental *calculus*, etc., the compositions of the invention have a real and practical "cleaning" effect, as it were, of the entirety of the oral cavities treated therewith.

Merely to illustrate in contradistinction to the benefits and advantages obtainable by practice of the present invention, and to highlight its great practicality and signifiicance, it is known that there are other materials capable of removing dental *calculus* or tartar and plaque from the teeth (and other oral cavity surfaces) of humans and other animals. While the nontoxic and simultaneously highly efficacious nature of compositions of the present invention are evident herein, it should be pointed out that many of the known materials and compositions indented for use in removal of dental *calculus* and so forth are oftentimes disregarding relative efficiencies and capabilities thereof, at least disagreeable, *per se*, or in any compositional form thereof if not actually harmful and dangerous for other reasons to the users of same.

Thus, to particularize in the extreme, use of such acidic materials as sulfuric acid, nitric acid and so forth certainly possibilitates removal of dental *calculus* but, along therewith, carries probably other literally disastrous effects on the teeth and other tissues of the user thereof.

Likewise, there are large numbers of polymer and other solvent and dispersing materials that are known to have, and which can physically (but not satisfactorily taking all things, and factors into account) function in a way that is analogous or similar to the organic carbonates and/or DMSO utilized in practice of the present invention. Many of these, for purposes of illustration and comparison, are itemized in the following listing, with which there must be considered the fact that while not in the same class of absolutely intolerable substances as the above-mentioned acids and the like, the below-indicated substances and their likes or equivalents are unsuitable or dissatisfactory for oral hygiene uses due usually to their relatively high toxicity if and when (intentionally or unintentionally) they are ingested, or on or in connection with use, are absorbed through or transfused into health living tissues or membranes. Additional to this, some of the listed undesirable oral hygiene materials (despite the fact of their literal capability of affecting dental *calculus* and/or plaque, etc.) tend to further actually "burn" and intolerably and severely aggravate and irritate living tissue when applied or used in concentrations necessary in any given instance with any given material of the type in question involved for necessary plaque control etc.; epecially noteworthy among these substances being such compounds as phenol and metacresol.

To be particularly mentioned and included amongst these genuerally undesirable solvent and the like materials for oral hygiene purposes as regards control of dental *calculus*, plaque and the like are, without limitation thereto: N,N - dimethylformamide; N,N - dimethylacetamide; N,N-diethylacetamide, pyrrolidone; meta cresol; tetramethyl urea; N,N,N'N'-tetramethyloxamide; hexamethyl- phosphoramide; sulfolane; and numerous other of such like and equivalent materials including those of the type and form disclosed and described in U.S. Pats. Nos 2,407,-714 through 2,407,727, inclusive; plus such other exemplary materials of the generally undesirable type explained for oral hygienic purposes as: N,N,N',N' - tetramethyl-alpha - ethylmalonamide; N,N,N',N' - tetramethylglutaramide; N,N,N',N'-tetramethylsuccinamide; Thiobis-(N,N-dimethylacetamide); Bis-(N,N - dimethylcarbamylmethyl) ether; N,N,N',N' - tetramethylfumaramide; Methyl succinonitrile; 1,2,3 - Tricyanopropane; Alpha-ethylsuccino-nitrile; Succinonitrile; Dioxane; Tetrahydrofuran; N,N-dimethylcyanoacetamide; Furane; N,N-dimethyl-beta-cy-ano-propionamide; The dimethyl ester of methane di-sulfonic acid; The Diethyl ester of ethane-1,2-disulfonic acid; Bis - (cyanomethyl) - sulfone; 1,2-Dithiocyanopropane; Bis-(thiocyanomethyl) ether; Beta-thiocyanoisobu-tyronitriles; 5 - Hydroxy - 2 - piperidone; 3 - Hydroxy-2-pyrrolidone; N-formylpiperidine; N-formyl - pyrrolidone; 2,2',4,4' - Tetra - amino - 5,5' - dimethyl-diphenylmethane; Nitronaphthol; Tetramethylene sulfoxide; Pentamethylene sulfone; N,N - bis-(cyanomethyl)formamide; N,N' - diformylpiperazine; N,N - dimethylmethoxyacetamide; N,N-dimethylcyanamide; Glyconitrile; Hydrocryl-onitrile; Indonitrile; etc.

PARTICULARIZED EXEMPLIFICATION OF THE INVENTION

While the many meritorius objectives and advantages of the present invention are evident in what is above indicated, they are yet further and even more readily apparent, discernible and understandable in and from the following further and more particularized description, explanation and exemplifications, wherein, unless otherwise indicated, all parts and percentages are to be taken and understood as being on a weight basis.

EXAMPLE I

The melting point of freshly vacuum-distilled ethylene carbonate having a structure according to the above Formula (I), is 36° C. It is readily depressed to a liquid condition at ambient temperatures by the addition of 5% or more of the completely compatible liquifying agents such as water, ethyl alcohol, ethyl acetate and chloroform. When solid ethylene carbonate is placed in contact with the teeth in the oral cavity, the moisture content present therein liquifies it on contact; and the so liquified material is effective in and for the dissolution and removal control of plaque and dental *calculus* in the oral cavity.

EXAMPLE II

Freshly vacuum-distilled propylene carbonate, per Formula (II) above, has a melting point of —49.2° C. When this material is cooled at about —80° C. (as in a acetone-Dry Ice bath) it supercools easily and remains liquid without crystallization for a period of several months. Propylene carbonate and ethylene carbonate are miscible in all proportions. The addition of 5% or more of propylene carbonate to ethlene carbonate yields a liquid composition which does not crystallize on standing. The resulting mixed composition is adaptable for use in practice of the present invention. Propylene carbonate is also miscible with ethyl alcohol, chloroform and diethyl ether in all proportions.

EXAMPLE III

Glycerol carbonate of the above Formula (III) is completely compatible with ethylene carbonate and especially with propylene carbonate or mixtures thereof, as well as with ethanol, any and all of such compositions being adapted for utilization in practice of this invention.

The polyoxyethylene glycols (PEG) having molecular weights of approximately 400, 600, 1000, 4000 and 6000 are soluble in ethylene carbonate and propylene carbonate, respectively to the extent of at least 100 grams of either or both carbonates, or mixtures thereof, in about 100 grams of any of said PEG's. Such compositions are adapted to advantageous use according to and in practice of the present invention.

Hexylresorcinol, camphor, isoeugenol and nonyl phenyl are respectively compatible in all proportions, with either ethylene carbonate (Formula (I) above) or propylene carbonate (Formula (II) above) or mixtures thereof. Preparations of this type are also well adapted to beneficial use and application according to and in practice of the present invention.

EXAMPLE IV

The solubilities of the below-specified substances in organic carbonate materials for use in practice of the present invention are:

(a) for zinc chloride about 33 grams in 1000 grams of ethylene carbonate;
(b) for mercuric chloride, about 49 grams in 100 grams of ethylene carbonate;
(c) for mercuric chloride, about 21 grams in 100 grams of propylene carbonate;
(d) for phenylmercuric acetate, about 52 grams in 100 grams of ethylene carbonate; and
(e) for phenylmercuric acetate, about 56 grams in 100 grams of propylene carbonate.

The utility and beneficial advantage for presently contemplated purposes of the above-indicated sorts of solutions are readily apparent to and discernible by those skilled in the art.

EXAMPLE V

Toothpastes of the following compositions were prepared by conventional and known methods:

| Composition No. | Parts of— | | |
|---|---|---|---|
| | "A" | "B" | "C" |
| (a) Glycerine | 5.25 | 15 | 46.50 |
| (b) Sorbital | 12.25 | 7.50 | 26 |
| (c) Ethylene carbonate | 50 | 75 | 25 |
| (d) Saccharin | 0.1 | 0.11 | 0.11 |
| (e) Sodium lauryl sulfate (neutral) | 0.7 | 0.7 | 0.71 |
| (f) Polyethyleneglycol (M.W. 4,000) | 1.51 | 1.5 | 1.5 |
| (g) Flavoring (to taste) about | 0.2 | 0.2 | 0.2 |

The use of these pastes by humans in brushing of teeth three times daily (after the teeth had been mechanically freed of plaque and *calculus*) prevented the formation of further plaque as measured by the standard and well-known fuchsin dye test.

Equivalently good and literally identical results were obtained with toothpastes formulated the same as above-indicated excepting to replace, as Ingredient (c) propylene carbonate for ethylene carbonate.

EXAMPLE VI

A number of prophylaxis pastes for use by dentists are formulated as follows (with Composition "D" being the control):

| Composition No. | Parts of— | | | |
|---|---|---|---|---|
| | "D" | "E" | "F" | "G" |
| (a) Navajo pumice (dental grade) | 71 | 71 | 71 | 71 |
| (b) Glycerine | 25 | | 10 | 15 |
| (c) Titanium droxide | 3 | 3 | 3 | 3 |
| (d) Saccharin | 0.25 | 0.25 | 0.25 | 0.25 |
| (e) Hydroxyethyl cellulose | 0.75 | 0.75 | 0.75 | 0.75 |
| (f) Ethylene carbonate | | 25 | 15 | 10 |
| (g) Flavoring (as desired) | (¹) | (¹) | (¹) | (¹) |

¹ The flavoring employed is utilized in the ratio 0.05 to 0.2 parts of oil of peppermint, oil of wintergreen, oil of spearmint, oil of cloves, or oil of anise; or mixtures of such flavoring agents and the like which, as desired, are pleasing and satisfactory.

Compositions "E," "F" and "G" are more effective in removing plaque and *calculus* as to time required for removal than the control Composition "D." Composition "B" is most effective, of the entire group, because of the higher concentration of the carbonate therein.

Equivalently good and literally identical results are obtained in analogous paste Compositions formulated the same as those above-indicated excepting to replace: as Ingredient (c), zirconium dioxide for titanium dioxide; and/or, as Ingredient (d) sodium cyclamate for saccharin; and/or, as Ingredient (f), propylene carbonate for ethylene carbonate.

EXAMPLE VII

The teeth of a human subject are thoroughly cleaned mechanically by a dentist until shown to be free of plaque by staining with a fuchsin dye, which causes the plaque, when present, to appear as granular deposits.

For the next ten days, twice daily, once in the morning and once in the evening, the teeth are painted thoroughly with propylene carbonate by means of a so-called "Q-tip" (which consists of absorbent cotton attached to the end of a wood or cardboard rod) saturated with the carbonate. After two minutes in each of the applicating treatments, the teeth and mouth are rinsed with water. The teeth are stained with the fuchsin dye and shown to be substantially free of plaque.

Similar results are obtained with the ethylene carbonate compositions per Example II, or the other propylene carbonate mixtures per Example II; and the compositions of Examples III and IV.

The teeth, following treatment with the carbonate compositions, feel at least as clean as if they were not only mechanically cleaned, but as if they were polished in addition to the mechanical cleaning.

EXAMPLE VIII

The teeth of a human subject are cleaned as in Example VII. Then, for the next ten days, they are cleaned by brushing using an electric toothbrush, twice a day (once in the morning and once in the evening) employing for control purposes a popular commercially-available toothpaste. At the end of five days, the fuchsin test shows noticeable evidence of plaque in the form of granular deposits. At the end of ten days, yellowing is apparent and the fuchsin test shows an increase in plaque deposits.

The teeth are then brushed twice a day, with propylene carbonate by a "Hard" toothbrush which is dipped in the carbonate. At the end of three days, fuchsin dye test shows the teeth to be substantially free of plaque. The teeth have a polished and clean feel.

The toothpaste compositions of Example V yield results comparable to those demonstrated by this Example.

EXAMPLE IX

The teeth of a human subject are cleaned as in the above Example VII. For the next five days, the teeth are not brushed nor is a mouth wash or dentifrice used. A yellowish plaque becomes obvious on most of the teeth. The fuchsin dye test shows the presence of plaque at the gingival margin of the teeth upward to the incisive edge of each tooth on the labral and lingual surfaces over areas varying from between about ½ to ⅔ of the surfaces of the teeth.

The teeth are then cleaned by brushing with a commercially available toothpaste for two minutes, leaving a band of plaque at the cervical margin of most of the teeth so as to cover between about ⅕ to ⅙ of the teeth surfaces. The teeth are then brushed with either ethylene carbonate or propylene carbonate, as in Example VIII, and after only one brushing with either of the mentioned carbonates, substantially all of the plaque is removed.

EXAMPLE X

Liquid dentifrices providing plaque retarding properties characteristic of the present invention, which are also useful as a mouth wash, incorporate the following formulations equivalent to most of those conventionally available:

| Formulation number | Parts of— "H" | "I" | "J" |
|---|---|---|---|
| (a) Ethyl alcohol | 725 | 730 | |
| (b) Methyl salicylate | 2 | 2 | 2 |
| (c) Oil of Thyme | 1 | 1 | 1 |
| (d) Eucalyptol | 1 | 1 | 1 |
| (e) Thymal | 5 | 5 | 5 |
| (f) Menthol | 5 | 5 | 5 |
| (g) Polyonyethylene stearyl ether | 3 | 3 | 3 |
| (h) Polythylene glycol 400 monostearate | 3 | 3 | 3 |
| (i) Ethylene carbonate | | 250 | |
| (j) Propylene carbonate | 250 | | |
| (k) Glyceryl carbonate | | | 250 |
| (l) Hexylresorcinol | 5 | | |
| (m) Isoeugenol | | 5 | |
| (n) Edible coloring dye | (as desired) | | |

EXAMPLE XI

A dry tooth powder of the following composition is prepared by conventional means by a uniform blending of the following ingredients:

| | Parts |
|---|---|
| (a) Precipitated Chalk | 24 |
| (b) Calcium Pyrophosphate | 24 |
| (c) Ethylene Carbonate (30 parts) premixed with (70 parts) of "Carbosil" (an ultrafine silica) | 50 |
| (d) Sodium Coconut Monoglyceride sulfonate | 1.25 |
| (e) Saccharin | 0.15 |
| (f) Flavoring and dye | 0.60 |

[1] Which is "Vinylite VYHH," a polymer commercially obtainable from Union Carbide Corporation.

Very good results in plaque and dental *calculus* control are obtained when human subjects use the tooth powder for brushing teeth at least twice daily. Equivalent good results are obtained when the same formulation is employed excepting to substitute propylene carbonate for ethylene carbonate as Ingredient (c).

EXAMPLE XII

A chewing gum suitable for aiding in the control of plaque is prepared by masticating, in a Banbury mixer, the following ingredients:

| | Parts |
|---|---|
| (a) Ultrafine (colloidol) Silica | 25 |
| (b) Chide [1] | 50 |
| (c) Propylene Carbonate | 15 |
| (d) Triethyl citrate | 10 |
| (e) Saccharin | To taste |
| (f) Cinnamon powder | To taste |

[1] Which is "Vinylite VYHH," a polymer commercially obtainable from Union Carbide Corporation.

In this connection other equivalent and characteristically similar polymers may be substituted in whole or in part, as is known by those skilled in the art, for the Ckrcle in chewing gum.

Equivalent good results are realized when the chewing gum composition is made the same as above indicated excepting to substitute, as Ingredient (c), ethylene carbonate for propylene carbonate and/or, as Ingredient (e), a cyclamate for saccharin.

EXAMPLE XIII

A mixture of about 100 parts of a copolymer of vinyl chloride and vinyl acetate in roughly equal molar coproportions and about 100 parts of propylene carbonate and compound on mill rolls (or in a Banbury mixer) by procedures well known to the plastic art. This yields a plasticized polymer mass. Following this, additional quantities of the carbonate (up to 150 parts) are added as required to yield a mass which, when cooled to about 25° C., is tacky and tends to adhere on dry human tissue.

This composition is then sheeted to about a ⅜ inch thickness and cut into strips having widths between about ¾ of an inch and 1¼ inches made in lengths of from about 1 inch to 8 or 9 inches. Sweetening flavoring agents and edible dyes may be added if desired.

These thus produced strips one useful in and for dental hygiene in the following manner: The teeth and the adjacent tissue in the mouth are first dried with absorbent cotton and the strip pressed onto the teeth. It is then allowed to remain there to soften the plaque and *calculus* on the teeth. In severe cases this allows the deposits to be removed mechanically more readily and, in less severe or mild cases, only brushing or continued use of the pads or of dentifices is required for the same desired end results.

Instead of the polyvinyl chloride copolymer indicated for use in the foregoing other polymers which are elastomeric or become plasticized to elastomers by the carbonates of this invention may be used for example the silicone polymers and copolymers; the acrylic polymers and copolymers; the vinyl acetate polymers and copolymers; the diene polymers and copolymers; the ethylene-propylene copolymer-type elastomers; the urethane polymers; the rubber-polyesters; the rubbery nylons; etc. may be employed. In addition, anesthetics antiseptics and antibiotics etc. may also be incorporated into the pads for specific purpose indicated.

Equivalent results are obtained when any other of the above-mentioned organic carbonates of Formulae (I) and (III) through (IX), or mixtures thereof (including those in which propylene carbonate may be present) are substituted for propylene carbonate for purposes of the herein-described types of strips.

EXAMPLE XIV

A partially lower denture is employed which consists of dental porcelain molars embedded in a cross-linked methacrylate polymer base on the right and left sides bridged in front by a curved gold strip terminating in a gold grid and frame embedded laterally in the plastic bases. Attached to the gold frame are gold clips and canine-tooth caps for retaining the denture in the mouth. The curved, gold, flat-strip in the front is positioned under the tongue and in contact with the lower gum. This thoroughly cleaned denture is inserted in the mouth of a human subject, and is not cleaned or brushed for three days (even when the remainder of the parmanent teeth are cleaned following removal of the denture which is replaced immediately following the cleaning of the permanent teeth).

After three days, a thick, yellowish plaque develops on the gold portion of the denture which, on cleaning with a commercial toothpaste and an electric toothbrush for two minutes, still leaves a film of attached plaque. This is particularly noticeable when the dentures are allowed to dry since the residue assumes the form of and makes a dull milky gold surface.

When this dull gold surface is coated with a small wad of absorbent cotton dipped in ethylene or propylene carbonate or cleaned with a toothbrush dipped in any of the carbonates of this invention, a clean, bright and highly polished gold surface is obtained.

Similar improvements in cleanliness are also observed for the embedded porcelain teeth and the plastic base when the same procedure according to the present invention is followed.

This Example also illustrates the high adhesive properties of plaque, even to such a relatively inert substance as metallic gold; and the benefits obtainable by practice of the present invention in and for removing plaque, etc., from such surfaces.

EXAMPLE XV

To illustrate the practice of the present invention by and with a composition suitable as a pad or sheet to be used as a cushion in the relief of poor-fitting dentures which are inserted between the denture and the gums and then compressed in place, the following is done. A composition is made which comprises an elastic polymer containing at least 1% of any of the carbonates of this invention which retard the build-up of plaque or other types of film on the interface of the denture normally in contact with the gums. In those cases where the denture has already caused at least one local sore spot, the cushion-pad may contain a topical anesthetic and, if desired, an antibiotic for the prevention of infection in the abrasions or cuts present in the gums.

The following is a typical formulation:

|   | Parts |
|---|---|
| (a) Elastomeric Polymer (polybutadiene or, alternatively, a silicone rubber | 100 |
| (b) Ethylene or Propylene Carbonate | 7.5 |
| (c) Triethyl Citrate | 15 |
| (d) Titania (tinted pink) | 15 |

With all of the foregoing being formulated with traces of saccharin and flavoring, as desired.

A formula for the same purpose may also be prepared to include and contain a topical anesthetic adding 2% benzocaine with or without 4% of benzyl alcohol.

If desired, antibiotics may also be included in the above formula by the addition, for example, per each gram of total composition:

(a) Bacitracen—500 Units; and/or
(b) Polymysin B sulfate—5000 Units; and/or
(c) Neomycin sulfate—5 mg.

Excellent results are obtained with any or all of the foregoing preparations.

EXAMPLE XVI

Very satisfactory and equivalent results are obtained when the procedures (and involved compositions and formulations) of any of the foregoing Examples V through XV, inclusive, are repeated in the same way as specified excepting to replace any of the indicated particular organic carbonates with DMSO.

Many changes and modifications can readily be made and adapted in embodiments in accordance with the present invention without substantially departing from its apparent and intended spirit and scope, all in pursuance and accordance with same as is set forth and defined in the hereto appended Claims.

What is claimed is:

1. A typically and conventionally formulated dentifrice preparation comprising at least one compound of the Formula:

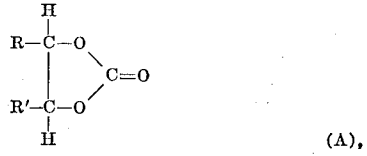

wherein R represents hydrogen and aliphatic hydrocarbon groups containing between 1 and about 18 carbon atoms; and R' represents R, HOR—, RCOOR—, —ROR—, —ROCOOR—, —ROCOOR and

—ROOC—R—COOR—

2. A typically and conventionally formulated mouth wash preparation comprising and made according to the composition of Claim 1.

3. A typically and conventionally formulated dentifrice preparation comprising from about 0.1 weight percent to about the totality therein of the composition of at least one compound selected from the group consisting of:

(a) dimethylsulfoxide; and
(b) a compound of the Formula:

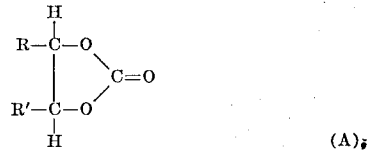

wherein R represents hydrogen and aliphatic hydrocarbon groups containing between 1 and about 18 carbon atoms; and R' represents R, HOR—,

RCOOR—,

ROR—, —ROCOOR—, —ROCCOR and

—ROOC—R—COOR

4. A typically and conventionally formulated mouth wash preparation comprising and made according to the composition of Claim 3.

5. Method for control and removal of plaque and dental *calculus* in oral hyginene procedures, which method comprises physically contacting said plaque and *calculus* with a material and effective amount of an agent for removing same that is a compound of the Formula (A) as in Claim 3.

6. An elastomeric oral hygine composition, comprised of a vinyl polymer and a composition admixed therewith which is according to the composition of Claim 3.

7. An elastomeric oral hygine composition, comprised of a silicone polymer and a composition admixed therewith which is according to the composition of Claim 3.

8. Method for control and removal of plaque and dental *calculus* in oral hygine procedures, which method comprises physically contacting said plaque and *calculus* with a composition containing at least between 0.1 weight percent and about the totality, based on the weight of the composition, of an agent for removing same that is a compound of the Formula (A) as in Claim 3.

9. The method of Claim 8, wherein said composition is a dentifrice composition.

10. The method of Claim 8, wherein said composition is a mouth wash composition.

11. The method of Claim 8, wherein said agent of said Formula (A) is present in said composition in an amount of at least about 5 weight percent is based on the weight of the composition.

12. The method of Claim 8, wherein said composition of said Formula (A) is ethylene glycol carbonate.

13. The method of Claim 8, wherein said composition of said Formula (A) is propylene glycol carbonate.

14. The method of Claim 8, wherein said composition of said Formula (A) is glyceryl carbonate.

References Cited

UNITED STATES PATENTS 3,362,927  1/1968  Lochridge  260—30.8 R

OTHER REFERENCES

*Chemical Abstracts*, Vol. 71, entry 58862q, 1969.
*Chemical Abstracts*, Vol. 72, entry 99065w, 1970.
*Chemical Abstracts*, Vol. 66, entry 121631c, 1967.

RICHARD L. HUFF, Primary Examiner

UNITED STATES PATENT OFFICE
CERTIFICATE OF CORRECTION

Patent No. 3,819,826  Dated June 25, 1974

Inventor(s) Gaetano F. D'Alelio

It is certified that error appears in the above-identified patent and that said Letters Patent are hereby corrected as shown below:

Column 1, line 14, "constituting" should read -- consisting --; lines 27 and 28, "intentially" should read -- intentionally --. Column 4, line 32, the pendant radical in Formula (IX) should read -- $-CH_2OCOC_2H_5$ --; line 64, the Formula over the arrow should read -- $(CH_3)_3NH$ --. Column 7, line 41, after "this" insert a comma. Column 9, line 74, after "N,N-diethylacetamide" insert a semicolon. Column 10, line 3, after "Nos" insert a period; Column 10, at the beginning of line 12, there should be no hyphen (-) between the "o" and "n"; Column 10, lines 16 and 17, "Beta-thiocyanoisobutyronitrile" should be singular; column 10, line 19, insert a hyphen (-) between "formyl" and "piperidine"; lines 24 and 25, "Hydrocrylonitrile" should read -- Hydracrylonitrile --; line 55, "Dry Ice" should read -- dry ice --. Column 13, between lines 27 and 30, the entire sentence "Which....Corporation." should be deleted; line 52, "Ckrcle" should read -- Chicle --.

UNITED STATES PATENT OFFICE
CERTIFICATE OF CORRECTION

Patent No. 3,819,820      Dated June 25, 1974

Inventor(s) Gaetano F. D'Alelio      Page - 2

It is certified that error appears in the above-identified patent and that said Letters Patent are hereby corrected as shown below:

Column 14, line 19, after "anesthetics" insert a comma.

Column 15, line 25, "Polymysin" should read -- Polymyxin --.

Signed and sealed this 12th day of November 1974.

(SEAL)
Attest:

McCOY M. GIBSON JR.      C. MARSHALL DANN
Attesting Officer      Commissioner of Patents